United States Patent [19]
Shorin et al.

[11] 3,828,995
[45] Aug. 13, 1974

[54] MUFFIN SEPARATOR

[75] Inventors: Joseph E. Shorin, New York, N.Y.; Vero Ricci, Collingswood, N.J.

[73] Assignee: Aggogle Inc., New York, N.Y.

[22] Filed: May 21, 1973

[21] Appl. No.: 362,551

[52] U.S. Cl.................................... 225/94, 99/537
[51] Int. Cl................................................. B26f 3/02
[58] Field of Search ............... 99/537; 30/128, 363; 225/93, 94, 96, 96.5

[56] References Cited
UNITED STATES PATENTS

| | | | |
|---|---|---|---|
| 2,810,416 | 10/1957 | Russell................................. | 99/537 |
| 2,818,097 | 12/1957 | Glanz.................................... | 99/537 |
| 2,840,129 | 6/1958 | Jovis..................................... | 225/94 |
| 2,979,095 | 4/1961 | Jovis..................................... | 225/94 |
| 3,091,270 | 5/1963 | Sampson.............................. | 99/537 |
| 3,119,428 | 1/1964 | Katzenstein......................... | 225/93 |

FOREIGN PATENTS OR APPLICATIONS

| | | | |
|---|---|---|---|
| 145,284 | 5/1954 | Sweden................................. | 99/537 |

*Primary Examiner*—John W. Huckert
*Assistant Examiner*—Stuart S. Levy
*Attorney, Agent, or Firm*—Mark T. Basseches; Paula T. Basseches

[57] ABSTRACT

The present invention is directed to a muffin separator for breaking English muffins or like bakery products into halves, the device incorporating a pair of generally U-shaped open frame members hingedly connected together about a common pivot axis, each said frame member including a series of tines which extend in a direction generally perpendicular to the pivot axis. The device is used by impaling the muffin on the tines when the same are aligned in parallel and thereafter spreading the halves, the device being characterized in that the tines extend across the pivot axis for a substantial portion of their length, whereby when the frames are shifted from a closed or parallel tine position toward an open position, the tines are shifted to an X configuration, resulting in an improved breaking action on the muffin, as contrasted with separators heretofore known.

7 Claims, 7 Drawing Figures

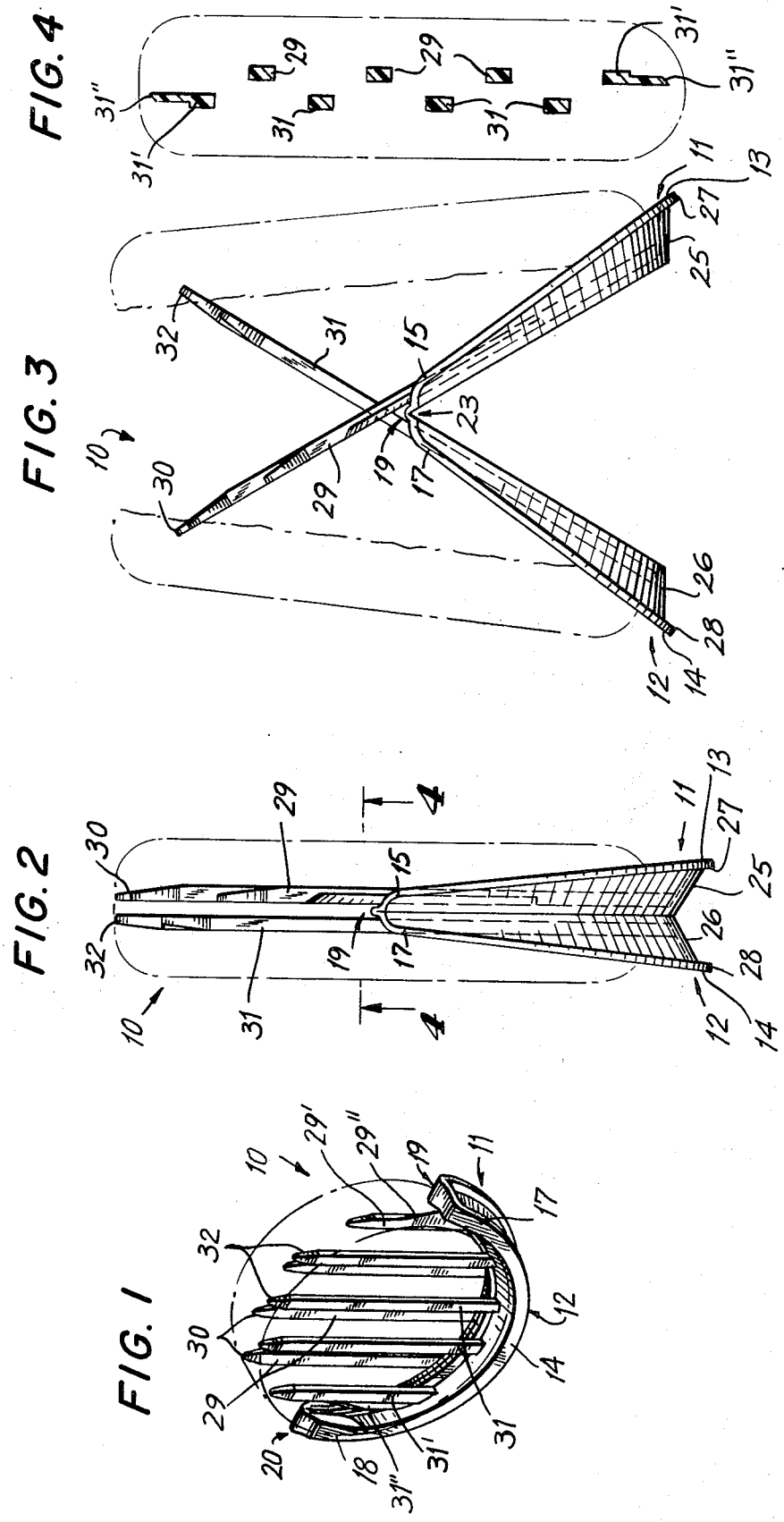

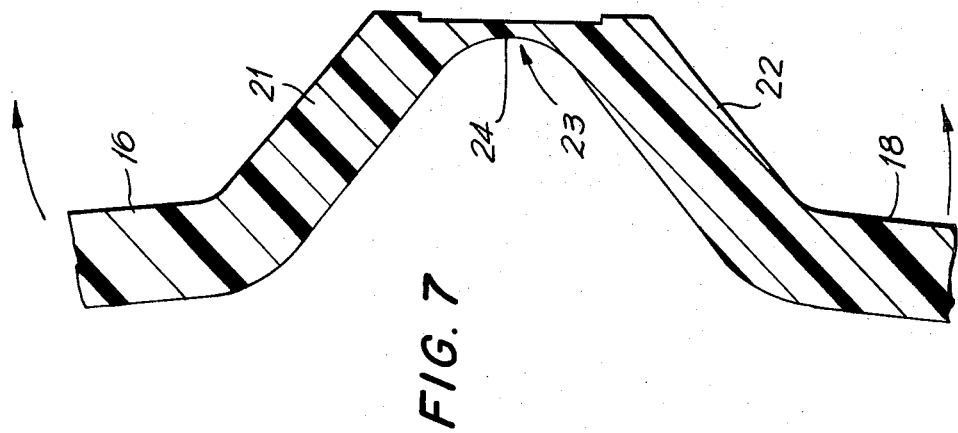
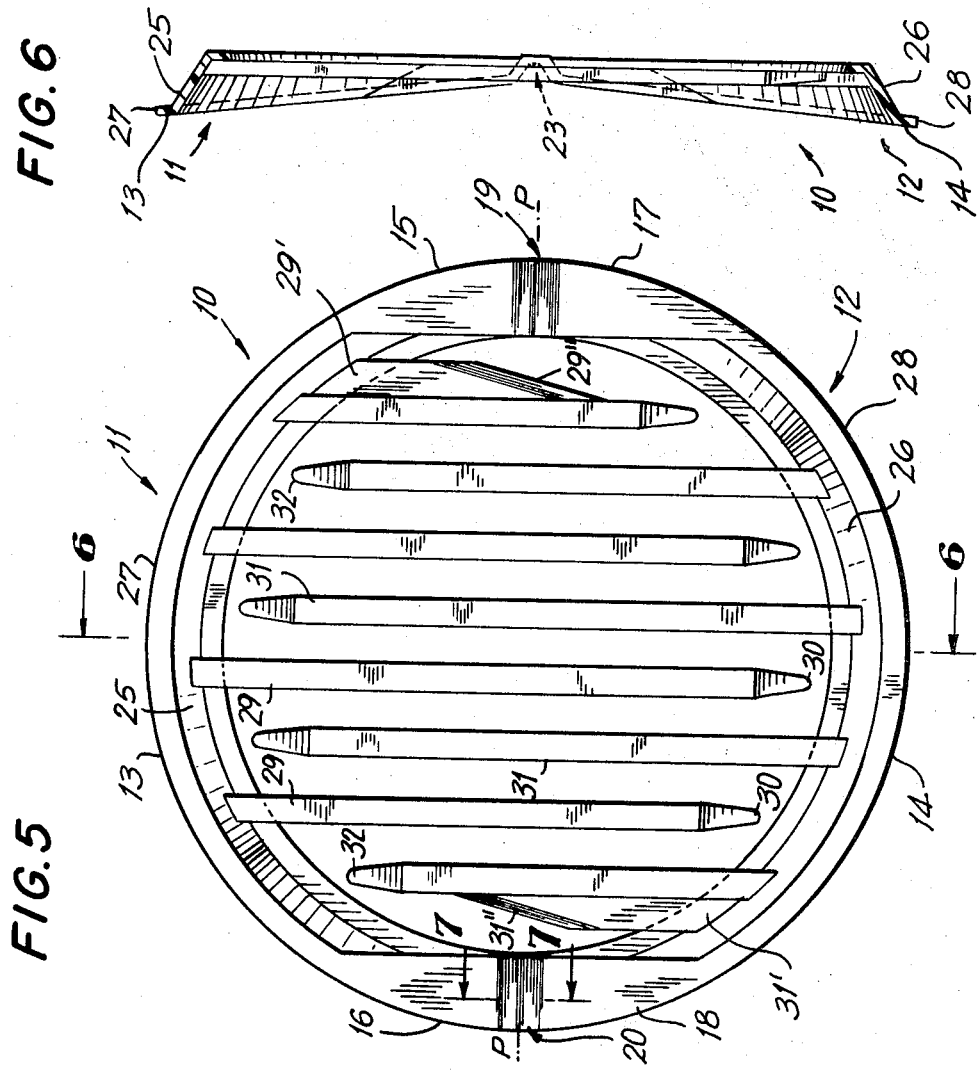

MUFFIN SEPARATOR

BACKGROUND OF THE INVENTION

1. Field of the Invention

The present invention is in the field of an improved muffin separator of the type in which two sets of tines are inserted into a muffin in generally parallel position, the tines being thereafter separated to break the muffin with a tearing action.

2. The Prior Art

It is known that muffins, and especially so-called English muffins, should be broken rather than sliced, for optimum enjoyment. If an English muffin is sliced by a knife, the slicing action is known to close the cells at the interface between the muffin halves, with the result that the subsequently toasted muffin will present a largely sealed surface, relatively non-absorptive of butter, jam or other food spread.

Various apparatuses have been suggested to effect the desired breaking action. By way of example, attention is directed to U.S. Pat. Nos. 2818,097; 2840,129; 2979,095; 3119,428; and Swedish Pats. Nos. 94,408 and 145,284.

SUMMARY OF THE INVENTION

The present invention may be summarized as being directed to an improved muffin separator which, by reason of its novel construction and manner of operation, is susceptible of being made of molded plastic material and, hence, being of sufficiently low cost to be included as a premium item or bonus, for instance to induce the purchase of muffins.

The apparatus is characterized by a frame having two sets of tines which are inserted into the muffin in parallel alignment, the tines upon actuation of the apparatus, opening in an X configuration whereby the muffin is subjected to a tearing action to both sides of a central axis defined by the crossing or intersection of the tines. The double breaking action of the X opening tines has been found superior to the action of muffin separators heretofore known which operate, for the most part, by the tines opening from a parallel configuration to a V shape.

It has been determined that the configuration in accordance with the present invention is superior in various aspects, including reduced likelihood of breaking of the muffin.

Most importantly, we have determined that by the use of an X configuration opening, a superior breaking action is obtained and the stresses imposed upon any increment of the tines are reduced as compared with a V opening breaker. The reduced stresses render feasible the use of a breaker fabricated of molded plastic material, as contrasted with the metal breakers employed in the V opening of other structures heretofore known.

In accordance with the invention, a pair of frames is provided, a set of tines being carried by each frame, the tines being in offset planes in the inserted position, the tines in addition being laterally offset along the frames to provide clearance for movement without interference to the X configuration. The noted displacement of the tines has the additional advantage of providing a more ragged tearing action than the separators of the prior art.

Accordingly, it is an object of the invention to provide an improved muffin separator.

It is a further object of the invention to provide an improved muffin separator having two sets of tines, which tines open into an X configuration, resulting in improved tearing action on the muffin.

A further object of the invention is the provision of a separator of the type described having reduced likelihood of breaking the muffin in the course of opening the same.

A still further object of the invention is the provision of a device of the type described wherein the stresses to which the tine elements are subjected in the course of spreading the muffin are reduced, permitting the fabrication of the separator from a polymeric composition.

Still a further object of the invention is the provision of a one-piece, molded muffin separator of the type described.

To attain these objects and such further objects as may appear herein or be hereinafter pointed out, reference is made to the accompanying drawings, forming a part hereof, in which:

FIG. 1 is a perspective view of a muffin separator in the folded position ready to receive a muffin;

FIG. 2 is a magnified vertical section taken on the line 2—2 of FIG. 1;

FIG. 3 is a view similar to FIG. 2 showing the position of the parts after movement of the apparatus to muffin breaking position;

FIG. 4 is a horizontal section taken on the line 4—4 of FIG. 2;

FIG. 5 is a plan view of the muffin separator in the open position thereof;

FIG. 6 is a section taken on the line 6—6 of FIG. 5;

FIG. 7 is a magnified sectional view taken on the line 7—7 of FIG. 5.

Referring now to the drawings and particularly to FIGS. 1 and 5, there is shown a muffin separator 10 which optionally but preferably is fabricated of an integral molded polymeric composition which, in addition to having high structural strength and resiliency, has substantial plastic memory characteristics. By way of example and without limitation, there may be employed a polypropylene and butyrate mix, which mix is moldable by injection molding, has the previously mentioned desirable characteristics, and in addition is resistant to fatigue breakage despite repeated folding, permitting the formation of an integral hinge. Mixtures of this sort have been approved by the United States Food and Drug Administration for use in environments where contact with food will be experienced.

The separator 10 includes open frame halves 11 and 12 which are generally U-shaped or semi-circular in configuration, the halves including central branch portions 13 and 14, respectively. A pair of leg members 15, 16 extends inwardly from the ends of the branch portion to complete the U configuration. In similar fashion, a pair of legs 17 and 18 extends inwardly from the ends of branch 14 to form the U-shaped frame member 12.

The ends of the legs 15 and 17 are linked by an integral hinge configuration 19. The ends of the legs 16 and 18 are correspondingly linked by an integral hinge 20.

As best appreciated from the enlarged view of FIG. 7, the legs 16, 18 (and also the legs 15, 17) may include offset transition portions 21, 22, which are angularly related to the major plane of the legs 16, 18, the transition portions being linked by a thin, readily flexible hinge flap 23.

It will be appreciated from the foregoing that if the legs 16, and 18 are pivoted in the direction of the arrows, FIG. 7, the hinge flaps will fold essentially about a pivot axis defined by the center portions 24 of the flaps 23 to the position of FIG. 2.

As best understood from an inspection of FIGS. 2 and 6, the central branch portions 13 and 14 may include arcuate reinforcing webs 25 and 26, respectively. A pair of arcuate rims or operating handles 27, 28 may extend beyond the outer perimeter of the webs 25, 26.

A set of tines 29 extends from the branch 13 toward the branch 14, the terminal ends 30 of the tines 29 terminating in proximate spaced relation to the branch 14. Preferably the terminal ends 30 may be beveled or sharpened to facilitate penetration of the muffin. It will be observed that the tines 29 are offset one from the other along the branch 13, the tines being perpendicular to the pivot line P—P defined by the hinges 19 and 20 — see FIG. 5.

In corresponding fashion, a second set of tines 31 extends from the branch 14 toward the branch 13, the free ends 32 of the tines 31 terminating in proximate spaced relation to the branch 13.

As best seen in FIGS. 1 and 5, the tines 29 and the tines 31 are laterally offset one from the other so that the tines of one set lie between the tines of the other set. It is important to note that the tines extend across the pivot line P—P, i.e., the free ends 30 and 32 of the tines lie at least a substantial distance to the opposite side of the pivot axis P—P from the portions of the tines which are connected to the branches 13, 14.

It will be apparent from the foregoing description that the normal position of the separator will be that shown in FIG. 5, namely, the "as molded" position. In use, the frames 11 and 12 fold from the essentially flat position of FIG. 5 to the active position of FIG. 2, whereat it will be observed that the rows of tines 29 and 31 are disposed in spaced parallel planes to opposite sides of the pivot axis P—P.

In use, a muffin, as shown in dot and dash lines, FIG. 2, is forced over the free ends 30, 32 of the tines. Thereupon the frames 11 and 12 are spread to the position shown in FIG. 3, whereby the muffin will be split or torn with a minimum amount of sealing or closure of the cells of the muffin.

It has been observed that the instances of damage or breakage of the muffin, e.g., fracture of the muffin halves other than along a plane centrally of the faces of the muffin, are substantially less in the X configuration opening system of the instant apparatus than with a conventional V opening unit. Moreover, there is less tendency with the X opening configuration for the tines to fracture, making possible the use of moldable polymeric materials, a factor which greatly reduces the cost of the unit, enabling its use as a premium or bonus giveaway item.

Similarly, it has been found that by locating the tines in offset planes in the inserting position, less cell closure is observed than is the case where the tines are merely laterally offset but essentially co-planar when inserted into the muffin.

While the instant separator has been illustrated in connection with essentially U or semi-circular shaped frames, it will be apparent that the utility of the apparatus is not restricted to such shape but, rather, may be used with equal feasibility in any configuration suitable to encompass the bakery product to be split.

Similarly, while the tines have been illustrated as being essentially rectangular in cross section—see FIG. 4, it may be desirable to form the same with a ribbed or like reinforcing cross section which will function to resist breakage in the course of operation.

Further, the endmost tines 29' and 31' in the illustrated embodiment are shown to have a somewhat greater transverse dimension than the other tines, a configuration which renders these tines of greater strength in view of the greater crust area to be fractured thereby. The endmost said tines 29' and 31' may include elongated beveled edges 29'' and 31'' which function to slit the side crusts of the muffin at two diametrically opposed portions adjacent the periphery in an area essentially aligned with the pivot axis. Such slitting will facilitate breaking by the tines, without sliding through and hence sealing any substantial portion of the cells in the muffin interior since the sliding action is restricted essentially to an area immediately adjacent the crust.

It will be further observed that by molding the muffin separator in the flat and folding the same to the muffin breaking position, the natural resiliency of the unit which tends to return the same to the flatwise condition exerts an additive force in the breaking of the muffin.

Having thus described the invention and illustrated its use, what is claimed as new and is desired by Letters Patents is:

1. A muffin separator of integrally molded, resilient, polymeric, composition comprising, in combination, first and second generally U-shaped frame halves, each including a central branch portion and a pair of leg members, first and second hinge means connecting the ends of the legs of one said frame with the corresponding leg ends of the other said frame for pivotal movement about a common pivot axis between a folded position wherein said frames are substantially in registry, to an open position wherein said frames are in generally co-planar alignment, each said frame including a set of tines having base end portions fixed to said branch and free end portions, the free end portions of said tines extending a substantial distance to the opposite side of said common axis from said base end portions, the tines of said sets being laterally offset along said branch portions with the tines of one said set being disposed between the tines of the other said set, whereby in partially open positions of said frames said tines define an X configuration.

2. The separator of claim 1 wherein, in the fully open position, said free end portions of the tines of each said set are disposed in proximate spaced relation to the branch portion supporting the bases of the tines of the other said set.

3. The separator of claim 1 wherein said sets of tines, in said folded position of said frames, are disposed in spaced parallel planes at opposite sides of said pivot axis.

4. The separator of claim 1 wherein the length of said tines at opposite sides of said common axis is essentially equal.

5. The separator of claim 1 wherein said separator is normally maintained by the memory characteristics of said molded polymeric compound in said open position.

6. The separator of claim 5 wherein said frames include integral handle portions offset from the plane of said frames.

7. A muffin separator in accordance with claim 1 wherein a tine of each said set nearest a leg includes a bevelled cutting edge portion positioned to cut diammetrically opposed portions of the muffin crust in registry with said pivot axis as the muffin is impaled on said tines.

* * * * *